(12) United States Patent
Lechner

(10) Patent No.: US 11,967,812 B2
(45) Date of Patent: Apr. 23, 2024

(54) CONTACTING SYSTEM

(71) Applicant: PFLITSCH GMBH & CO. KG, Hückeswagen (DE)

(72) Inventor: Martin Lechner, Lindlar (DE)

(73) Assignee: Pflitsch GmbH & Co. KG, Hückeswagen (DE)

( * ) Notice: Subject to any disclaimer, the term of this patent is extended or adjusted under 35 U.S.C. 154(b) by 0 days.

(21) Appl. No.: 18/365,690

(22) Filed: Aug. 4, 2023

(65) Prior Publication Data
US 2023/0378729 A1  Nov. 23, 2023

Related U.S. Application Data

(63) Continuation of application No. PCT/EP2022/052281, filed on Feb. 1, 2022.

(30) Foreign Application Priority Data

Feb. 4, 2021 (DE) .......................... 102021102569.9

(51) Int. Cl.
*H02G 3/06* (2006.01)
*F16L 5/06* (2006.01)
(Continued)

(52) U.S. Cl.
CPC .............. *H02G 3/0675* (2013.01); *F16L 5/06* (2013.01); *H01R 13/5205* (2013.01);
(Continued)

(58) Field of Classification Search
CPC ...... H02G 3/0675; H02G 3/0666; H02G 3/06; H02G 1/14; H02G 3/00; H02G 3/0616;
(Continued)

(56) References Cited

U.S. PATENT DOCUMENTS 3,603,912 A * 9/1971 Kelly ................... H02G 3/0616
285/341
4,116,472 A * 9/1978 Schmitt ................ H02G 3/0616
285/151.1
(Continued)

FOREIGN PATENT DOCUMENTS

CH  690809 A5  1/2001
DE  1949189 A1  4/1971
(Continued)

OTHER PUBLICATIONS

International Search Report issued in corresponding International Application PCT/EP2022/052281, dated Jun. 1, 2022.

*Primary Examiner* — Angel R Estrada
(74) *Attorney, Agent, or Firm* — Burris Law, PLLC

(57) ABSTRACT

The disclosure relates to a contact-making system for electromagnetically compatible high-current applications. The contact-making system includes a screw bushing, an actuating element and a clamping element. The clamping element includes at least one inner lateral surface and at least a first end face. The screw bushing includes a connecting thread on a first side of the screw bushing, for connection to a connecting geometry. The actuating element includes a counterpressure end face. An inner radius of the clamping element is reduced by means of a radial force. The actuating element is screwed to the first side of the screw bushing, where the radial force is applied to at least the first end face of the clamping element by screwing the actuating element to the screw bushing, and the counterpressure end face of the actuating element is brought into contact with a first end face of the clamping element.

13 Claims, 4 Drawing Sheets

(51) Int. Cl.
*H01R 13/52* (2006.01)
*H01R 13/622* (2006.01)
*H01R 13/6581* (2011.01)

(52) U.S. Cl.
CPC ....... *H01R 13/622* (2013.01); *H01R 13/6581* (2013.01); *H02G 3/0666* (2013.01)

(58) Field of Classification Search
CPC .............. H01R 13/5205; H01R 13/622; H01R 13/6581; H01R 13/621; F16L 5/06; F16L 5/08; F16L 5/00
USPC ............... 174/652, 654, 650, 656, 657, 665; 248/68.1, 49, 74.1, 74.2; 16/2.1, 2.2; 285/149.1, 151.1
See application file for complete search history.

(56) References Cited

U.S. PATENT DOCUMENTS

| | | | | |
|---|---|---|---|---|
| 4,608,454 | A | | 8/1986 | Lackinger |
| 5,350,204 | A | * | 9/1994 | Henniger ............. H02G 3/0675 174/665 |
| 5,600,094 | A | * | 2/1997 | McCabe ............. H02G 3/0616 174/653 |
| 6,355,888 | B2 | * | 3/2002 | Feketitsch ........... H02G 3/0675 174/78 |
| 7,781,685 | B2 | | 8/2010 | Bartholoma et al. |
| 8,690,599 | B2 | * | 4/2014 | Bartholoma ......... H02G 3/0666 439/98 |
| 8,841,562 | B2 | * | 9/2014 | Drotleff ............... H02G 3/0675 174/360 |
| 11,411,378 | B2 | * | 8/2022 | Schnieder ........... H02G 3/0675 |
| 2008/0231041 | A1 | | 9/2008 | Bucchi |
| 2008/0268687 | A1 | | 10/2008 | Dixon et al. |
| 2020/0393064 | A1 | | 12/2020 | Lechner |
| 2021/0376584 | A1 | | 12/2021 | Schnieder |

FOREIGN PATENT DOCUMENTS

| | | |
|---|---|---|
| DE | 3737345 A1 | 5/1989 |
| DE | 19523795 C1 | 12/1996 |
| DE | 19857340 A1 | 7/1999 |
| DE | 102008011978 A1 | 9/2009 |
| DE | 202011002287 U1 | 7/2012 |
| DE | 102008011978 B4 | 6/2016 |
| EP | 0901209 A1 | 3/1999 |
| EP | 1922793 B1 | 11/2011 |
| EP | 3022806 B1 | 6/2018 |
| EP | 3598594 A1 | 1/2020 |

* cited by examiner

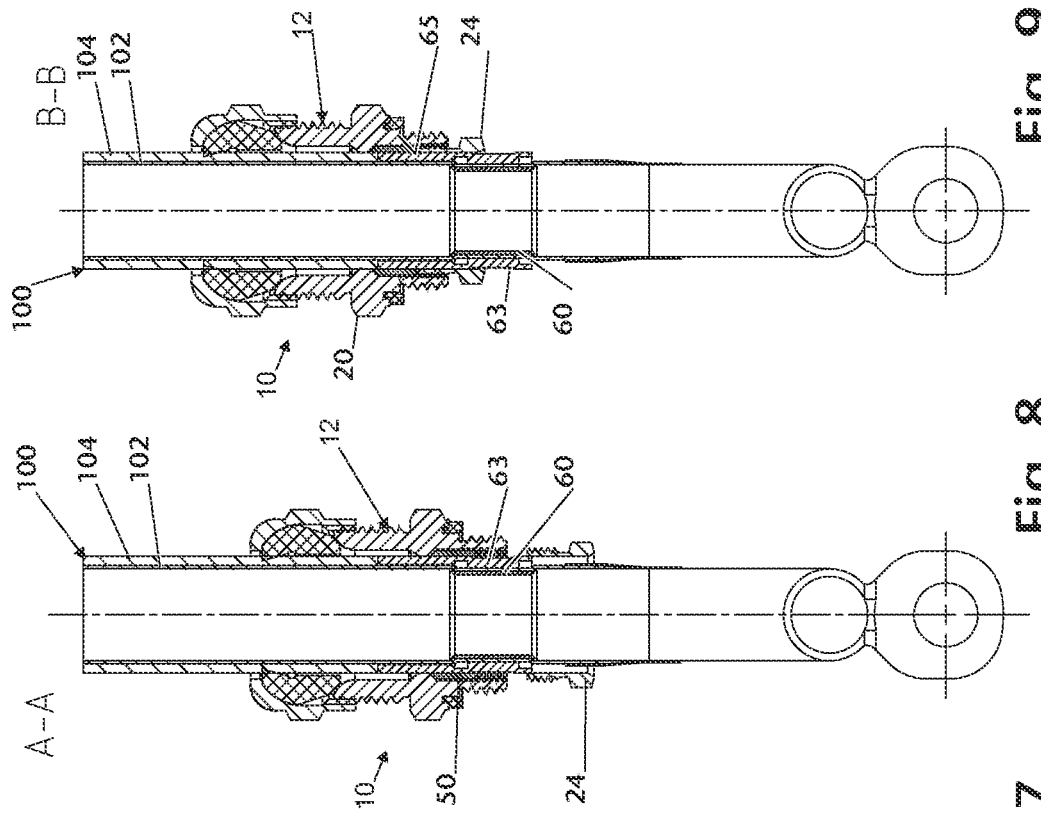
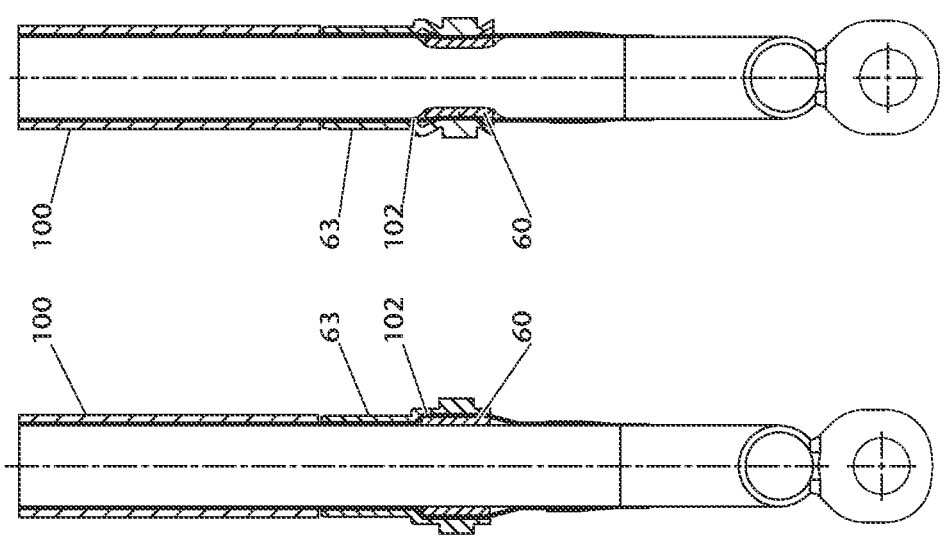
Fig. 6    Fig. 7    Fig. 8    Fig. 9

CONTACTING SYSTEM

CROSS-REFERENCE TO RELATED APPLICATIONS

This application is a continuation of International Application No. PCT/EP2022/052281, filed on Feb. 1, 2022, which claims priority to and the benefit of DE 10 2021 102 569.9, filed on Feb. 4, 2021. The disclosures of the above applications are incorporated herein by reference.

FIELD

The present disclosure relates to to a contacting system, a use of a contacting system, a screw joint system and a method for dissipating electrical currents of a shielding of a long-moulded part.

BACKGROUND

The statements in this section merely provide background information related to the present disclosure and may not constitute prior art.

Contacting systems for dissipating electrical currents from long moulded parts are generally known from the state of the art. For example, DE 10 2008 011 978 B4 discloses a screw joint for sealed cable bushings. This comprises a double nipple, which comprises a seal on one side and can be screwed into an adapter on the opposite side. An EMC (electromagnetic) seal can be introduced into the adapter, which can contact a shielding of a long-moulded part.

EP 3 598 594 A1 discloses a cable gland with a strain relief which is clamped to a cable when a mounting socket is screwed into an intermediate socket.

US 2008/268687 A1 discloses a cable connector comprising a connector housing having on one side an external thread to which the connector housing is connectable to a terminal geometry.

EP 0 901 209 A1 discloses a cable gland for making an electrical contact of a stripped zone of a cable.

EP 1 922 793 B1 discloses a kit for at least two different cable glands with clamping elements for the capturing of different cable diameters.

The disadvantage of the solutions known from prior art is that the order in which the individual parts are screwed together is mandatorily predefined. For example, in the case of the cable feed-through of DE 10 2008 011 978 B4, the sleeve must first be attached to the connection geometry, then it must be screwed to the EMC seal, and only then must the seal and strain relief be tightened.

Another disadvantage from the prior art is that it is known that the stripped shielding must end in the contacting area. For example, DE 37 37 345 A1 discloses a screw joint for stripped cables in which a shielding is shortened to a specified length so that it can be clamped between a crimp body and a ring part. This leads to small tolerances in the assembly of the long-moulded part, which makes it even more difficult.

The systems known from prior art are also designed in such a way that a stripped shielding must have a length specified by the EMC seal so that it can be reliably contacted. As a rule, the long-moulded part fitting must be screwed tight after the EMC seal is activated.

Alternatively, the screwing of the long-moulded part fitting and the activation of the EMC seal is carried out with the same assembly step.

SUMMARY

This section provides a general summary of the disclosure and is not a comprehensive disclosure of its full scope or all of its features.

The present disclosure provides an improved contacting system and/or screw joint system. In particular, the present disclosure provides a contacting system and/or a screw joint system that facilitates the assembly of a long-moulded part. In particular, the present disclosure provides a contacting system and/or a screw joint system that enables subsequent activation and/or deactivation of an EMC seal. Furthermore, the present disclosure provides an improved use of a contacting system. Furthermore, the present disclosure provides an improved method for dissipating electrical currents of a shielding of a long-moulded part.

According to the present disclosure, a contacting system, in one form for electromagnetically compatible high-current applications, comprises a screw-on sleeve, wherein the screw-on sleeve on a first side comprises a connection section, an actuating element and a clamping element, wherein the clamping element comprises at least one inner sheath surface and at least one first end surface, wherein the connection section comprises a connection thread and an actuating thread, wherein the screw-on sleeve on the first side of the screw-on sleeve comprises the connection thread for connection with a connection geometry, wherein the connection thread is essentially arranged radially further out than the actuating thread for receiving the actuating element, and wherein the actuating element comprises a counter-pressure end surface, wherein an inner radius of the clamping element can be reduced at least in sections by means of a radial force, wherein the actuating element with the actuating thread can be screwed onto the first side of the screw-on sleeve and wherein the radial force can be applied to at least the first end surface of the clamping element by screwing the actuating element onto the screw-on sleeve while at least the counter-pressure end surface of the actuating element can be contacted with a first end surface of the clamping element.

Furthermore, a contacting system for contacting an exposed shielding of a long-moulded part is provided.

Furthermore, a screw joint system comprising the above-mentioned contacting system is provided.

Furthermore, a method for dissipating electrical currents of a shielding of a long-moulded part is provided that comprises the steps of:
  provision of the above-mentioned contacting system,
  partial exposure of a shielding of a long-moulded part and introduction of it into the contacting system,
  screwing an actuating element of the contacting system of a screw-on sleeve, wherein the actuating element acts on a clamping element in such a way that the clamping element exerts a radial force on the shielding of the long-moulded part, wherein the clamping element is electrically contacted with the shielding or with an element connected to the shielding, such as a crimp sleeve for example, by screwing on the actuating element.

A contacting system is proposed, in one form, for electromagnetically compatible high-current applications. This comprises a screw-on sleeve, wherein the screw-on sleeve on a first side comprises a connection section, an actuating element and a clamping element. The clamping element comprises at least one inner sheath surface and at least one first end surface, wherein the connection section comprises a connection thread and an actuating thread. In one form, the clamping element is intended for electrical contacting of a shielding of a cable routed through the contacting system. The screw-on sleeve comprises the connection thread on the first side of the screw-on sleeve for connection to a connection geometry, wherein the connection thread is essentially arranged radially further out than the actuating thread for receiving the actuating element. The actuating element comprises a counter-pressure end surface. An inner radius of the clamping element can be reduced, at least in sections, by means of a radial force. The actuating element with the actuating thread can be screwed onto the first side of the screw-on sleeve, wherein the radial force can be applied to at least the first end surface of the clamping element by screwing the actuating element onto the screw-on sleeve while at least the counter-pressure end surface of the actuating element can be contacted with a first end surface of the clamping element.

The contacting system comprises a screw-on sleeve. In one form, this is a hollow cylindrical body. According to the present disclosure, the screw-on sleeve comprises a connection section. In one form, the connection section essentially extends over the entire length of the screw-on sleeve. In a further form, the connection section extends over a section of the screw-on sleeve, in one variation, over only part of the length of the screw-on sleeve. The connection section, in one variation, extends up to a screw ring. In a further form, the connection section comprises a connection thread. In one form, it is provided that the screw-on sleeve comprises a connection thread for connection to a connection geometry. In one variation, the connection thread is designed as an external thread. In a further form, it is provided that the connection thread and/or the connection section is designed in such a way that it can be screwed into a recess of a connection geometry not belonging to the present disclosure and/or it can be introduced.

This enables a favourable EMC seal. An EMC seal within the meaning of the invention comprises, in one form, a device for ensuring electromagnetic compatibility and/or dissipating a particularly induced current into or out of a shielding of a long-moulded part.

In one form, there is no need to pay attention to an excess length of the stripped shielding. In one variation, the shielding does not need to end at the point of contact. Another advantage entails the actuation of the contacting system independently of the actuation of the pressure screw to seal the long-moulded part. For example, a strain relief of the cable can thus be provided independently of electrical contacting of the shielding.

The connection section comprises the actuating thread. According to the present disclosure, it is provided that the connection thread is essentially arranged radially further out than the actuating thread to receive the actuating element. In one form, connection threads and actuating threads are arranged concentrically. In one variation, connection threads and actuating threads are arranged essentially at the same height in the longitudinal direction of the screw-on sleeve. In a further form, it is provided that the connection thread is arranged radially on the outside and the actuating thread radially on the inside of the screw-on sleeve. In one variation, the actuating thread is located in the connection section of the screw-on sleeve. In a further form, the connection thread and actuating thread start on the same side, in one variation, the first side, of the screw-on sleeve or the connection section. In one variation, actuating threads and connection threads are adjacent to a first end surface of the first side of the screw-on sleeve.

The contacting system comprises a first side and prefers a second side opposite the first side. The first side is, in one variation, the side of the contacting system, which can be assigned to a connection geometry or introduced into it.

A connection geometry not belonging to the invention can be, for example, a wall or a housing. In one variation, the connection geometry comprises a recess or thread suitable for connecting the connection section of the screw-on sleeve.

Exemplary lists are not to be regarded as exhaustive in the sense of the invention but can be supplemented within the scope of general specialist knowledge.

In a further form, the screw-on sleeve is designed as a double nipple. In one variation, the double nipple comprises the connection section on one first side. In one variation, the double nipple comprises a receptacle for a pressure screw on a second side. In another variation, the double nipple on the second side is designed in such a way that it at least partially comprises a seal element.

In a further form, the screw-on sleeve comprises a screw ring, which, in one variation, comprises spanner contact surfaces. In one variation, the screw ring limits the connection section. In the form of the screw-on sleeve as a double nipple, the screw ring can be arranged between the connection section and the receptacle for the pressure screw.

The screw-on sleeve comprises a pressure end surface in one form. Preferably, the pressure end surface is arranged on a formed structure or material accumulation on an inner wall of the screw-on sleeve. In one variation, the pressure end surface is a partial surface of a section that is at least partially circumferential on the inside. In a further form, the pressure end surface is an essentially conical surface, the cone axis of which is, in one variation, essentially equal to a longitudinal axis of the screw-on sleeve. In one variation, the cone is at an angle of about 30° to about 60°, in one variation, about 45°.

In one form, it is provided that the screw-on sleeve comprises a pressure end surface, wherein the clamping element can be introduced or applied into or onto the screw-on sleeve in such a way, in one variation, screwed in or screwed on, that the counter-pressure end surface of the actuating element contacts the first end surface of the clamping element.

In one form, it is provided that the screw-on sleeve comprises a pressure end surface, wherein the clamping element can be introduced into the screw-on sleeve, in one variation, screwed in, in such a way that a pressure end surface of the screw-on sleeve contacts a second end surface of the clamping element, and a counter-pressure end surface of the actuating element contacts a first end surface of the clamping element.

If, in the context of the invention, the term "about" is used in connection with values or ranges of values; it is to be understood as a tolerance range which the person skilled in the art considers customary in this field, in particular, a tolerance range of ±20%, in one form ±10%, being furthermore in another form, ±5% is provided.

To the extent that different ranges of values, such as ranges of values, for example, are specified in the present disclosure, the lower limits and the upper limits of the different ranges of values can be combined with each other.

The term "essentially" indicates a range of tolerances that are acceptable to the person skilled in the art from an economic and technical point of view so that the corresponding feature can still be recognized as such or realized.

In one form, it is provided that the pressure end surface of the screw-on sleeve can be arranged parallel to the second end surface of the clamping element in an assembly target position. In one variation, the second end surface is conical. Furthermore, in another variation, the second end surface is essentially at the same angle to a cone axis or longitudinal axis as the pressure end surface.

The conical form of the pressure end surface and/or the second end surface has the advantage that they can easily slide off each other. When a force is applied to the clamping element in the direction of the longitudinal axis, part of the force is deflected into a radial force so that the clamping element can deform, in one variation, radially inwards.

In one form, it is provided that a decoupling element or a spring element is arranged between the first end surface and the counter-pressure end surface and/or the second end surface and the pressure end surface. in one variation, a spring element can exert a preload on the clamping element. In one variation, a spring element is used to compensate for an ambiguous geometry of the shielding, a change in geometry during a temperature change and/or a movement of the parts of the contacting system so that lasting contact is guaranteed. The spring element can be, for example, a helical spring or a disc spring.

The contacting system comprises an actuating element. In one variation, the actuating element comprises a recess that is completely continuous in the longitudinal direction, in one form, for reception or passage of the long-moulded part. In another variation, the actuating element is designed as a hollow cylinder. In one variation, the actuating element comprises a smooth inner wall at least in sections, in one variation, being completely continuous. In another variation, the actuating element comprises an inner wall flat in the longitudinal direction of the actuating element at least in sections, in one variation, in a completely continuous manner. A flat inner wall within the meaning of the present disclosure is to be understood as an inner wall without material accumulations, projections, recesses, grooves, sections and so on, each of which projects inwards, in one variation, radially. The actuating element, in one variation, an external thread or an internal thread. In one variation, the thread of the actuating element corresponds to the actuating thread of the screw-on sleeve so that the actuating element can, in one variation, be screwed into the screw-on sleeve or screwed onto the screw-on sleeve. In one variation, the actuating element is designed in such a way that the inner wall of the actuating element is essentially aligned with an inner sheath surface of the clamping element. In one variation, the inner wall of the actuating element and the inner sheath surface of the clamping element are designed to align with each other with a tolerance of about 0.01 mm to about 1 mm, in one variation, from about 0.1 mm to about 0.9 mm. In one form, it is provided that the inner wall of the actuating element comprises a larger radius or a greater clear width than the inner sheath surface of the clamping element. In one variation, the inner wall of the actuating element and/or the inner sheath surface of the clamping element is or are designed in such a way that the shielding does not compress when the contacting system is assembled, in one variation, when the actuating element is actuated or screwed. In one variation, this can be achieved by having an inner diameter of the actuating element over its length, in one variation, over its full length, greater than or equal to an inner diameter of the clamping element, in one variation, in the unactuated state. In another variation, the inner wall of the actuating element and/or the inner sheath surface of the clamping element is or are designed in such a way that, when the contacting system is assembled, in one variation, when the actuating element is actuated or screwed, the shielding can protrude from it over a length of the actuating element. The different forms mentioned above favourably allow a large tolerance when cutting the shielding to length. In contrast to contacting systems from prior art, which require a certain length of the exposed shielding so that they do not compress or deform the shielding, the proposed actuating element achieves that the shielding is not limited to a maximum permissible length. This simplifies assembly considerably.

In one variation, the actuating element can be screwed into the screw-on sleeve, screwed in or tightened if the connection section of the actuating element is arranged in a connection geometry. This form favourably enables the flexible assembly of the contacting system independently of the assembly of the long-moulded part on a consumer, strain relief and/or seal. For example, the contacting system is screwed into a connection geometry by means of the connection thread. The stripped long-moulded part is threaded through the contacting system, in one variation, the screw-on sleeve, the clamping element and the actuating element, in such a way that a shielding of the long-moulded part is essentially arranged in the area of the clamping element. In this form, the actuating element can be slightly screwed into or onto the actuating thread of the screw-on sleeve. The long-moulded part can now be installed on a consumer, for example, as intended. In contrast to solutions known from prior art, there is a high tolerance here: If the cable is slightly shorter or slightly longer than intended, the clamping element is still arranged around the stripped area of the long-moulded part. It is particularly favourable that the stripped part of the shielding of the long-moulded part does not have an exact length, since the clamping element can be positioned as desired, in particular, in a longitudinal position on the stripped shielding.

The actuating element comprises a counter-pressure end surface. In one form, it is provided that the counter-pressure end surface of the actuating element can be arranged at least partially parallel to the first end surface of the clamping element in the assembly setpoint position. In one variation, the counter-pressure end surface interacts with the first end surface when the actuating element is screwed or tightened into the screw-on sleeve. In one variation, the first end surface is conical. In another variation, the first end surface is essentially at the same angle to a cone axis or longitudinal axis as the counter-pressure end surface.

The conical form of the counter-pressure end surface and/or the first surface have the advantage that they can easily slide off each other. In the event of a force on the clamping element in the direction of the longitudinal axis, in one variation, when screwing in or tightening the actuating element, part of the force is deflected into a radial force so that the clamping element can deform, radially inwards in one variation.

The contacting system comprises the clamping element. In one variation, this is hollow cylindrical. In one variation, the clamping element is designed as a sleeve. Further, in another variation, the clamping element is made of an electrically conductive material, in one variation, a metal. The clamping element comprises the inner sheath surface and, in one variation, an outer sheath surface as well as the first end surface and, in one variation, a second end surface. The clamping element is designed in such a way that it can be radially deformed when a radial force is exerted onto at least the first end surface, the second end surface and/or the outer sheath surface. In one variation, the inner radius can be reduced by means of a radial force. In one form, it is provided that by means of a force directed along the longitudinal axis to the first and/or second end surface of the clamping element, it can be deflected at least partially radially inwards. In a further form, it is provided that the first end surface and/or the second end surface of the clamping element comprises a chamfer. Further, at least the first end surface and/or the second end surface are conical. Further, in one variation, at least the first end surface and/or the second end surface comprises a first partial surface which comprises a surface vector which is essentially directed in the direction of the longitudinal axis of the clamping element and, in one variation, a second partial surface which is conically designed. In one form, the first end surface and/or the second end surface is essentially completely conical. In another form, it is envisaged that the first end surface and/or the second end surface have a rounding.

Preference is given to the clamping element, screw element, actuating element, support sleeve and/or crimp sleeve made of an electrically conductive material.

In one form, it is provided that the clamping element comprises a completely continuous slit in the direction of a longitudinal axis of the contacting system, a plurality of slits distributed around the circumference, or no slits. A completely continuous slit has the advantage that the clamping element can essentially lie over the entire surface of the shielding of the long-moulded part. In a further form, it is provided that the shielding comprises a plurality of slits that are partially continuous in the longitudinal direction. The clamping element is, in one variation, designed to be "comb-shaped". In one variation, the clamping element comprises a plurality of tabs between the slits, which are elastically or plastically deformable if a radial force is exerted on them. In a further form, it is provided that the clamping element does not comprise any slit. In one variation, a wall thickness in the area is essentially at least sectional, in one variation, over a complete length of the clamping element, dimensioned in such a way that the clamping element is plastically and/or elastically deformable if a radial force acts on it by means of the actuating element.

In a further form, it is provided that the screw-on sleeve is made of a single piece or a plurality of parts, in one variation, designed as two pieces, with the clamping element. In the form of a multi-part, in one variation, two-part, screw-on sleeve and clamping element, the clamping element can be accommodated inside the screw-on sleeve. In one variation, in the form of the screw-on sleeve composed as a single piece with the clamping element, the clamping element is arranged on the first side of the screw-on sleeve. In one variation, the clamping element connected to the screw-on sleeve as a single piece extends away from the actuating thread, which is, in one variation, designed as an external thread in the longitudinal direction of the screw-on sleeve. In another variation, the clamping element connected to the screw-on sleeve as a one piece extends away from the connection thread of the screw-on sleeve in the longitudinal direction of the screw-on sleeve. In a further form, it is provided that the actuating thread is arranged, in one variation, in the longitudinal direction between the connection thread and the clamping element. In one variation, the actuating thread is an external thread. In another variation, the actuating thread has a smaller outer diameter than the connection thread. In one form, it is provided that the actuating element comprises an internal thread. In one variation, an outer diameter of the actuating element is less than or equal to an outer diameter of the connection thread.

In one variation, the clamping element connected to the screw-on sleeve as a single piece is materially connected to the screw-on sleeve or it is composed of a single material. In one variation, the screw-on sleeve and clamping element are made of one material. The clamping element, in one variation, comprises a conductive material. In another variation, the clamping element comprises at least one material selected from a group comprising a metal, in one variation, copper, conductive plastic and/or carbon.

In one form, the contacting system comprises a support sleeve, which can, in one variation, be arranged or pushed under a shielding of a long-moulded part, and/or a crimp sleeve, which can be arranged between the shielding and the clamping element. In one variation, the support sleeve is hollow cylindrical. In another variation, the support sleeve is as long or longer as the clamping element, in one variation, 1.5 times to 2 times as long as the clamping element. The length of the support sleeve in relation to the length of the clamping element is, in one variation, the tolerance with which the clamping element can be attached to the shielding, in one variation, in the longitudinal direction. In one form, the support sleeve is designed as a rigid sleeve. In one variation, the support sleeve is made of an electrically conductive material, in one variation, metal. In one variation, the support sleeve can be slid under the shielding of the long-moulded part before it is introduced into the screw-on sleeve. Furthermore, the support sleeve can essentially be arranged in an area in which the clamping element is arranged, in one variation, in such a way that the clamping element presses directly or indirectly against the support sleeve when a radial force is applied. In one variation, the shielding can be clamped between the support sleeve and the clamping element. In one variation, a higher pressure can be applied to the shielding by means of the support sleeve than systems known from prior art. In one variation, this form achieves electrical currents from 100 A to 1000 A, in one variation, at least 300 A to 500 A, can be dissipated.

In one form, the support sleeve is designed to be squeezable. The support sleeve, which can be crimped in one variation, is crimped under the stripped shielding of the long-moulded part or fastened frictionally by means of plastic deformation, in one variation, before the cable is introduced into the screw-on sleeve and is, in one variation, permanently arranged there. In one form, the support sleeve comprises a crimp area. In a further form, the support sleeve comprises a crimp area and a support area that is, in one variation, not provided for crimping. In one variation, the crimp area is thinner-walled than the support area. In one variation, the support area is thinner-walled than the crimp area. In one variation, the crimped support sleeve is placed between the shielding and one core of the long-moulded part. The advantage of the embodiment is that the support sleeve is arranged captive on the long-moulded part.

In a further form, a crimp sleeve is, in one variation, applied to the long-moulded part in addition to a crimped support sleeve. In one variation, the crimp sleeve is crimped at least above the stripped shielding, in another variation, above the support sleeve. In one form, the crimp sleeve and support sleeve are crimped in a single step. The crimp sleeve is, in one variation, longer than the support sleeve, in another variation, longer than the stripped area of the shielding. In one form, the crimp sleeve comprises a crimp section. In a further form, the crimp sleeve comprises a sheath section. In one variation, the crimp section is intended for crimping and, in another variation, the sheath section is not intended for crimping. In another variation, the sheath section is thinner-walled than the crimp section, at least in sections. In one variation, this form increases the area in which the clamping element can be arranged on the long-moulded part for electrical contacting. In one variation, the stripped shielding can be completely covered by the crimp sleeve.

The advantage of this form is that the shielding is not damaged or frayed if the long-moulded part is frequently assembled and disassembled.

The long-moulded part, which does not belong to the present disclosure, in one variation, comprises a sheath, a shielding and at least one core. The shielding can be designed as a braid, reinforcement or film. In one variation, the shielding is electrically conductive and, in another variation, ensures electromagnetic compatibility of the long-moulded part. In one form of the contacting system, it is provided that an at least partially stripped long-moulded part can be introduced into the contacting system in such a way that, when the actuating element is screwed to the screw-on sleeve, the clamping element is pressed in such a way that electrical contact can be established with a shielding or with an element connected to the shielding by means of at least part of the inner sheath surface of the clamping element.

One form of the contacting system comprises a screw-on sleeve, an actuating element and a clamping element. The clamping element comprises a second end surface and a first end surface, as well as an outer sheath surface and an inner sheath surface. The clamping element comprises a completely continuous slit in the direction of the longitudinal axis, wherein the slit comprises a gap width that allows the clamping element to be compressed on it when a radial force is applied to it.

The actuating element comprises a thread with which it can be screwed into the screw-on sleeve or screwed onto it. Furthermore, the actuating element comprises a counter-pressure end surface, which interacts with the first end surface of the clamping element when mounted.

As an example, the clamping element is introduced into the screw-on sleeve and its second end surface rests against the pressure end surface of the screw-on sleeve. The actuating element is screwed into the screw-on sleeve and rests with the counter-pressure end surface against the first end surface of the clamping element. If the actuating element is screwed in further, a force is applied to the clamping element on its end surfaces. Due to the conical form of the end surfaces and the pressure end surface as well as the counter-pressure end surface, the applied force is deflected radially inwards, and the first surface slides on the pressure end surface and the second surface slides off on the counter-pressure end surface. The inner radius of the clamping element is thus reduced, and the gap width of the slit is reduced.

In the contacting system, a long-moulded part with a shielding and a sheath can be arranged. The long-moulded part, which is threaded into the screw-on sleeve as an example, comprises a section where the sheath has been removed. A support sleeve may be placed under the stripped shielding. The clamping element is arranged around the shielding. The clamping element can also be located in the area of the support sleeve. If the actuating element is tightened, the clamping element deforms and exerts pressure on the shielding with its inner sheath surface. The support sleeve does not cause any major deformations of the clamping element and/or the shielding, but the radially inward acting force is used to clamp the shielding between the clamping element and the support sleeve. In one variation, this support sleeve ensures, for example, that there is always the same clamping diameter, which is, in one variation, equal to one diameter of the support sleeve plus two times the shielding thickness. Another advantage of the support sleeve is an abutment for clamping by means of the clamping element. In one variation, before tightening the actuating element, the position of the contacting system in relation to the long-moulded part can be changed. Thus, the final position of the actuated contacting system on the long-moulded part may differ from the pre-assembly position.

In another form, the support sleeve can be placed under the stripped shielding while a crimp sleeve is placed above the stripped shielding. If the crimp sleeve is crimped on the long-moulded part, the support sleeve is also crimped. Due to the plastic deformation of the crimp sleeve and support sleeve, these components of the contacting system remain permanently on the long-moulded part and protect the shielding, in one variation, in the event of frequent assembly and disassembly of the long-moulded part. The crimp sleeve allows a larger tolerance range to be created on which the clamping element can be positioned to dissipate electrical currents on the long-moulded part, in one variation, if the crimp sleeve is longer than the stripped area. Furthermore, the surface of the crimp sleeve, in one variation, offers better electrical contact with the clamping element than, for example, a shielding made of a wire mesh. In one variation, a surface of the crimp sleeve and/or a designated inner sheath surface of the clamping element is designed in such a way that electrical contacting is improved, for example, roughened or smoothed.

In a further form, which can be combined with the above-mentioned forms, the screw-on sleeve is designed as a double nipple so that it can accommodate a pressure screw and a seal element for sealing and fixing a long-moulded part, for example.

In a further form, it is provided that the contacting system comprises a screw-on sleeve that is designed as a single piece, in one variation, designed a single piece with the clamping element. As an example, the clamping element comprises a plurality of slits on a first side, in one variation, to facilitate deformation. The actuating element comprises a counter-pressure surface on its inner side as well as a thread, which is, in one variation, designed as an internal thread. The actuating thread is located between the connection thread and the clamping element. When the actuating element is screwed onto the actuating thread, the clamping element is plastically and/or elastically deformed while the counter-pressure surface acts on a first end surface of the clamping element and a force, which is applied by tightening the actuating element, is at least partially deflected radially inwards.

Furthermore, it is proposed to use the contacting system described above for directly or indirectly contacting an exposed shielding of a long-moulded part.

In a form of a use of the contacting system, it is provided that the at least partially stripped long-moulded part can be introduced into the contacting system in such a way that a support sleeve can be arranged between at least one core of the long-moulded part and the shielding of the long-moulded part. For example, the support sleeve can be pushed under the stripped shielding by hand and/or crimped under the shielding using a tool.

In a form of a use of the contacting system, it is provided that the at least partially stripped long-moulded part can be introduced into the contacting system in such a way that, when the actuating element is screwed to the screw-on sleeve, the clamping element can be deformed in such a way that the clamping element directly or indirectly exerts a radial force onto the shielding. In one variation, at least one force acting in the longitudinal direction is at least partially deflected radially inwards. In one variation, a force acting in the longitudinal direction of the contacting system is at least partially deflected radially inwards by means of at least one conical end surface of the clamping element, a conical pressure end surface of the screw-on sleeve and/or a conical counter-pressure end surface of the actuating element. The clamping element contacts the shielding with its inner sheath, in one variation, over the entire surface.

In one form of a use of the contacting system, it is provided that the clamping element presses the shielding against the support sleeve. Due to the counter bearing, which is formed by the support sleeve, the clamping element can exert a high pressing force on the shielding, which, in one variation, ensures that high currents can be transmitted, for example, from 100 A to 1000 A.

In a further form, it is provided that the long-moulded part is held in a force-fit and/or sealed manner by means of a pressure screw that can be screwed on a second side of the screw-on sleeve and a seal element. In one variation, by means of the pressure screw and the seal element, strain relief can be made possible by the frictional connection of the long-moulded part. The strain relief is, in one variation, attachable and detachable independently of the electrical connection of the clamping element to the shielding.

Furthermore, a screw joint system comprising the contacting system described above is proposed.

In one variation, the screw-on sleeve of the contacting system of the screw joint system is designed as a double nipple. In a further form, it is provided that the screw-on sleeve comprises a connection section and a pressure absorption section. In one variation, the pressure absorption section comprises a pressure absorption thread, which is, in another variation, designed as an external thread. In one form, the screw joint system comprises a pressure screw that can be screwed onto the screw-on sleeve, in one variation, onto the pressure absorption section. In the screw-on sleeve, in one variation, in the pressure absorption section of the screw-on sleeve, a seal element can, in one variation, be used, at least partially. The seal element can, in one variation, be deformed by means of the pressure screw by screwing it onto the pressure absorption section in such a way that the long-moulded part that can be introduced into the screw joint system is sealed and/or strain-relieved in it. In one variation, it is provided that the actuation of the pressure screw can be carried out completely independently of the actuation of the contacting system. In this way, the long-moulded part can be screwed together, i.e., guided through a connection geometry and sealed and/or a strain relief is provided there without the contacting system being actuated. In one variation, the contacting system is actuated by screwing in or tightening the actuating element at any time before or after the pressure screw is actuated.

Furthermore, a method for dissipating electrical currents of the shielding of the long-moulded part comprises the steps of:
a. provision of the contacting system described above,
b. partial exposure of the shielding of the long-moulded part and introduction of it into the contacting system, and
c. screwing an actuating element of the contacting system to a screw on sleeve, wherein the actuating element acts on a clamping element in such a way that the clamping element exerts a radial force on the shielding of the long-moulded part or on an element connected to the shielding, wherein the clamping element is electrically contacted with the shielding or with an element connected to the shielding by screwing the actuating element.

In one form, it is provided that the clamping element is at least partially radially deformed by screwing in the actuating element. In one variation, a force is exerted on the first end surface and/or the second end surface of the clamping element, which, in another variation, are conical. Due to the at least partially slotted form of the clamping element, the first and/or second end surface on the pressure end surface of the screw-on sleeve and/or the counter-pressure surface of the actuating element can slide off and at least partially reduce the inner radius of the clamping element and/or exert a force onto a long-moulded part, its stripped shielding or the crimp sleeve around which the clamping element is arranged.

In one form, it is provided that a support sleeve is placed under the shielding before the long-moulded part is introduced into the contacting system. In one variation, the support sleeve is fixed by means of an adhesive tape or similar, for example, by narrowing the shielding before the long-moulded part is threaded into the screw-on sleeve.

In one form, it is provided that the screwing in of the actuating element for clamping the clamping element with the shielding or on an element connected to the shielding, in one variation, a crimp sleeve as the element connected to the shielding, takes place before or after a connection of the long-moulded part to a consumer.

The shielding does not have to end at the contact point.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6 is a cross-sectional view of a long-moulded part with a support sleeve and a crimp sleeve—uncrimped according to the present disclosure;

FIG. 7 is a cross-sectional view of a long-moulded part with a support sleeve and crimp sleeve—crimped according to the present disclosure;

FIG. 8 is a schematic cross-sectional view of a long-moulded part with support sleeve and crimp sleeve in a screw-on sleeve with the actuating element unscrewed according to the present disclosure;

FIG. 9 is a schematic cross-sectional view of the long-moulded part from FIG. 8 in a screw-on sleeve with a screwed-in actuating element;

Figure 1:
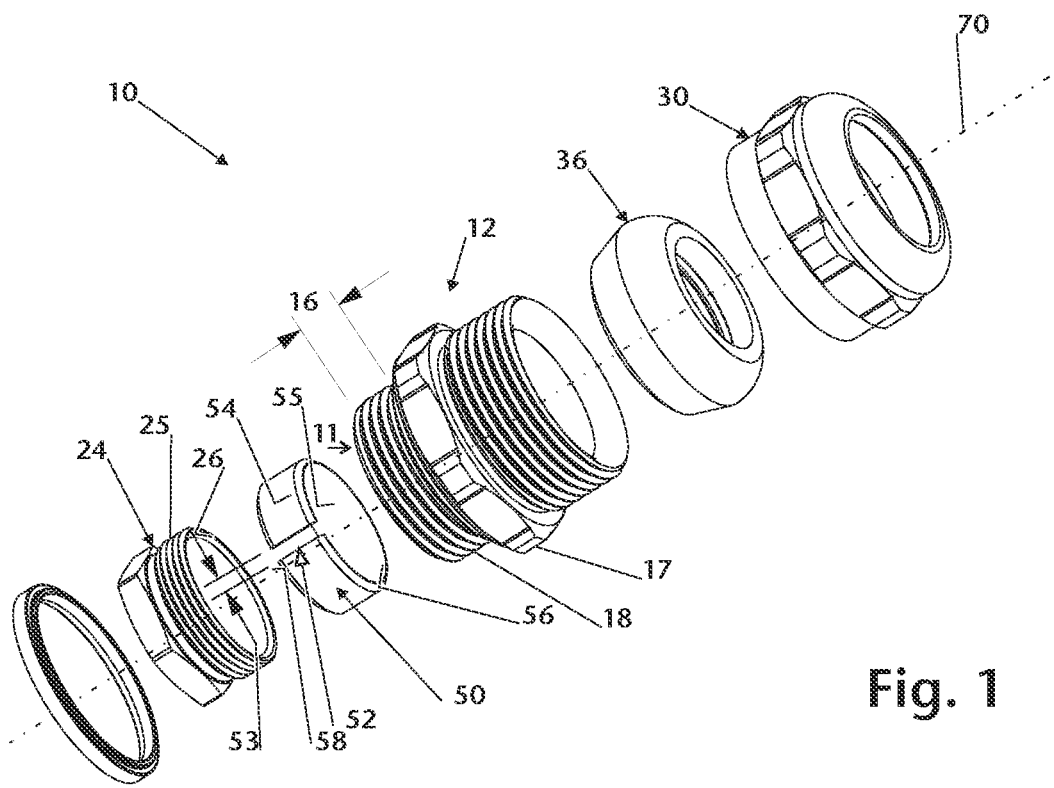
FIG. 1 is an exploded perspective view of a contacting system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an exploded view of a contacting system 10 with a screw-on sleeve 12, an actuating element 24 and a clamping element 50 according to the present disclosure. The clamping element 50 comprises a second end surface 56 and a first end surface 58 as well as an outer sheath 54 and an inner sheath surface 55. The clamping element 50 comprises a completely continuous slit 52 in the direction of the longitudinal axis 70 of the contacting system 10, wherein the slit 52 comprises a gap width 53 which allows the clamping element 50 to be compressed within the screw-on sleeve 12 with a radial force.

The actuating element 24 comprises a thread 25 with which it can be screwed into the screw-on sleeve 12. Furthermore, the actuating element 24 comprises a counter-pressure end surface 26, which interacts with the first end surface 58 of the clamping element 50 when assembled.

The screw-on sleeve 12 is designed as a double nipple so that it can accommodate a pressure screw 30 and a seal element 36 for sealing and fixing a long-moulded part. The screw-on sleeve 12 comprises a connection section 16 on a first side 11, which is limited on one side by a screw ring 17. With the connection section 16, the screw-on sleeve 12 can be introduced into a connection geometry (not shown here) or screwed in by means of the connection thread 18.

Figure 2:
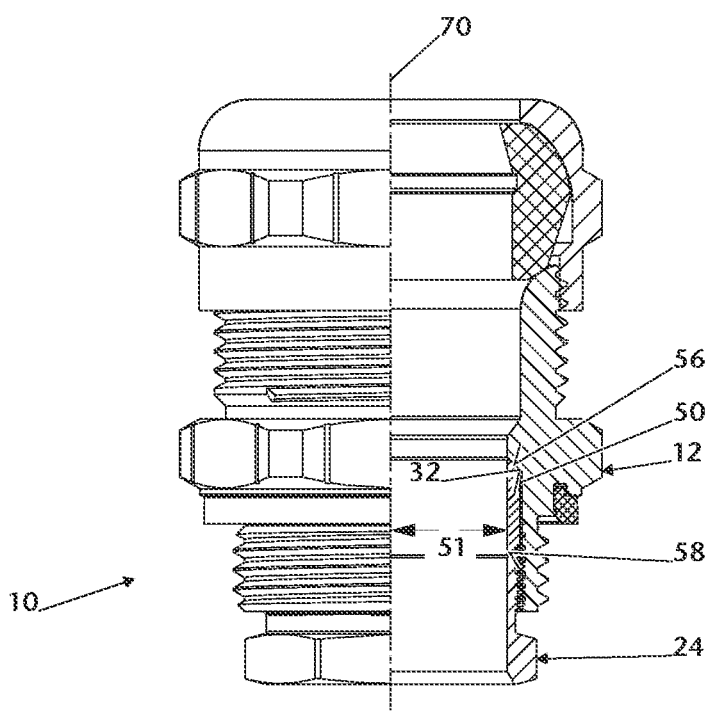
FIG. 2 is a partially cut view of the assembled contacting system from FIG. 1.

FIG. 2 shows a cut-in-half view of the contacting system 10 of FIG. 1 in assembled form. The clamping element 50 is introduced into the screw-on sleeve 12 and its second end surface 56 rests against the pressure end surface 32 of the screw-on sleeve 12. The actuating element 24 is screwed into the screw-on sleeve 12 and rests with the counter-pressure end surface 26 on the first end surface 58 of the clamping element 50. If the actuating element 24 is screwed in further, the clamping element 50 is applied a force to its end surfaces 56 and 58. Due to the conical embodiment of the end surfaces 56 and 58 and the pressure end surface 32 as well as the counter-pressure end surface 26, the applied force is deflected radially inwards and the first surface 56 slides at the pressure end surface 32 and the second surface 58 slides off at the counter-pressure end surface 26. The inner radius 51 of the clamping element 50 is thus reduced and the gap width 53 of the slit 52 is reduced.

Figure 3:
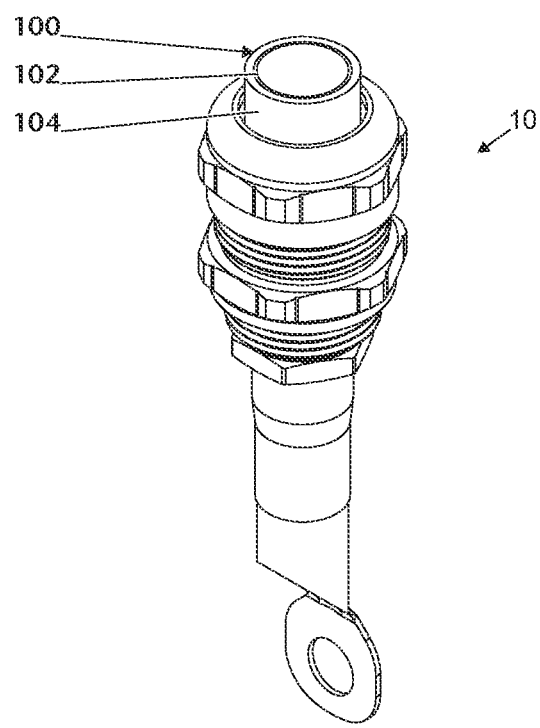
FIG. 3 is a view of a further form of the contacting system according to the present disclosure.

FIG. 3 shows a view of a further embodiment of the contacting system 10. In the contacting system 10, a long-moulded part 100 with a shielding 102 and a sheath 104 is arranged.

Figures 4, 5:
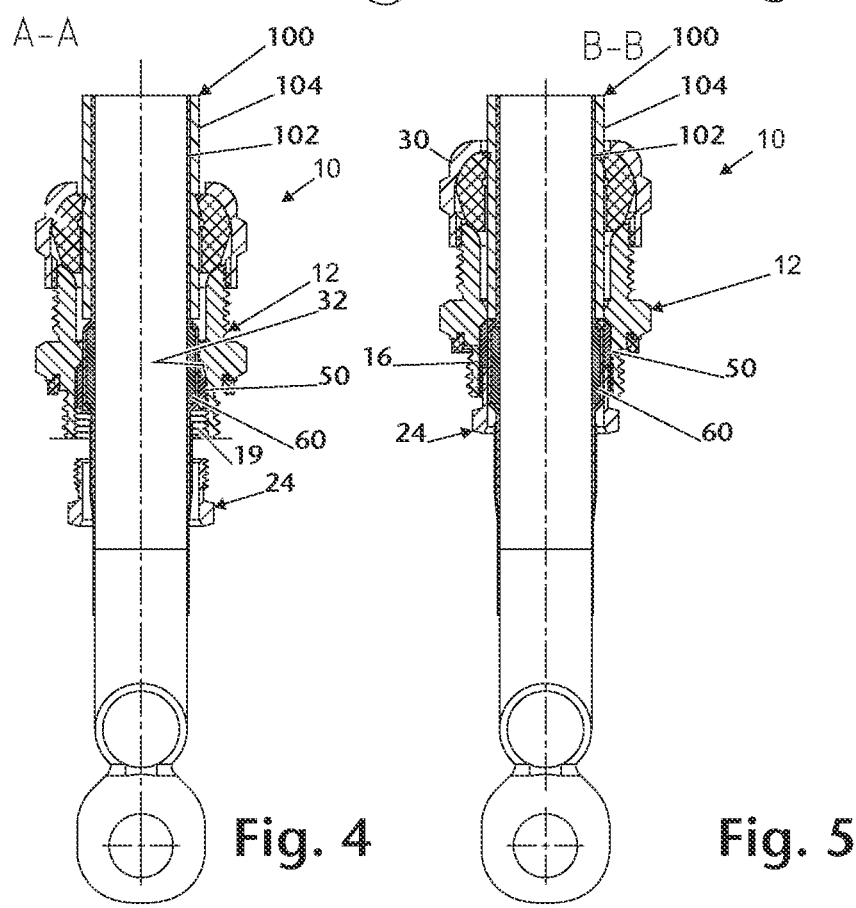
FIG. 4 is a cross-sectional view of the contacting system from FIG. 3 with the actuating element unscrewed.
FIG. 5 is a cross-sectional view of the contacting system from FIG. 3 with a screwed-in actuating element.

FIG. 4 shows the contacting system 10 from FIG. 3 in a sectional view where the actuating element 24 is not screwed into the screw-on sleeve 12. The long-moulded part 100, which is threaded into the screw-on sleeve 12, comprises a section that is not indicated for the sake of clarity where the sheath 104 is removed. A support sleeve 60 is arranged under the stripped shielding 102. The clamping element 50 is arranged around the shielding 102. The clamping element 50 is also arranged in the area of the support sleeve 60.

FIG. 5 shows the contacting system 10 from FIG. 4, in which the actuating element 24 is screwed into the screw-on sleeve 12. If the actuating element 24 is tightened, the clamping element 50 deforms and exerts pressure on the shielding 102 with its inner sheath surface, which is not indicated herein. The support sleeve 60 does not cause large deformations of the shielding 102, but the radially inward force is used to clamp the shielding 102 between clamping element 50 and support sleeve 60. In one variation, before tightening the actuating element 24, the position of the contacting system 10 on the long-moulded part 100 can be changed. For example, FIG. 5 shows the final position of the actuated contacting system 10 on the long-moulded part 100 from the position at pre-assembly in FIG. 4. In one variation, it is not necessary to pay attention to an excess length of the stripped shielding 102. Another advantage is the actuation of the contacting system 10 independently of the actuation of the pressure screw 30 for sealing the long-moulded part 100.

FIG. 6 shows a long-moulded part 100 with a support sleeve 60 and a crimp sleeve 63. The support sleeve is placed under the stripped shielding 102, while the crimp sleeve 63 is placed above the stripped shielding 102.

FIG. 7 shows the crimped crimp sleeve 63, wherein the support sleeve 60 has also been crimped. Due to the plastic deformation of crimp sleeve 63 and support sleeve 60, these components remain permanently on the long-moulded part 100 and protect the shielding 102, particularly during frequent assembly and disassembly of the long-moulded part 100.

FIG. 8 and FIG. 9 show the long-moulded part 100 with support sleeve 60 and crimp sleeve 63 arranged in a contacting system 10, wherein FIG. 8 shows the unactuated contacting system 10 and FIG. 9 shows the actuated contacting system 10. The crimp sleeve 63 provides a wider tolerance range on which the clamping element 50 is positioned to dissipate electrical currents on the long-moulded part 100. Furthermore, the surface 65 of the crimp sleeve 63 favourably provides better electrical contact with the clamping element 50 than, for example, a shielding 102 made of a wire mesh. Favourably, a surface 65 of the crimp sleeve 63 and/or one shown in FIG. 1, the inner sheath surface 55 of the clamping element 50 is designed in such a way that electrical contact is improved, for example, roughened or smoothed.

Figure 10:
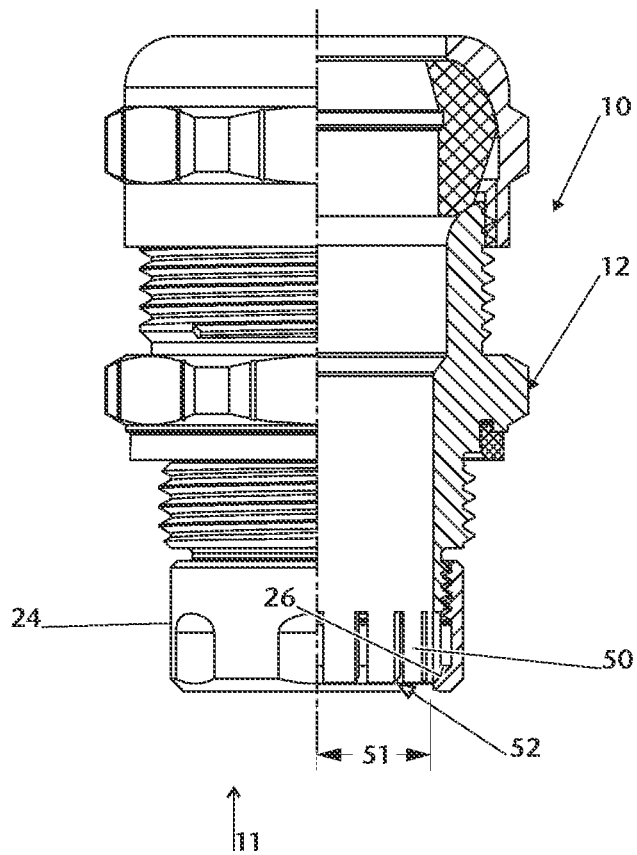
FIG. 10 is a further form of the contacting system according to the present disclosure.

FIG. 10 shows a further form of the contacting system 10, in which the screw-on sleeve 12 and the clamping element 50 are designed as a single piece or as a single part. The clamping element 50 comprises a plurality of slits 52 on the first side 11, of which only one is indicated as an example. The actuating element 24 comprises a counter-pressure surface 26 on its inner side.

Figure 11:
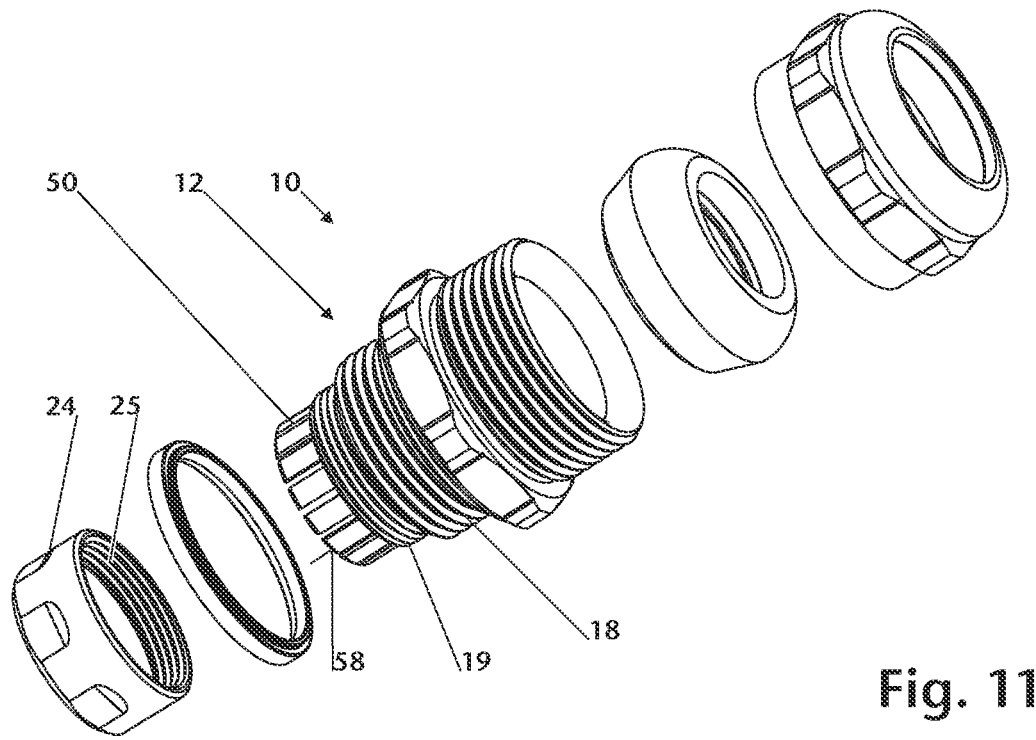
FIG. 11 is an exploded perspective view of the contacting system in accordance with FIG. 10.

FIG. 11 shows an exploded view of the contacting system 10 from FIG. 10. The actuating thread 19 is placed between the connection thread 18 and the clamping element 50. The actuating element 24 comprises a thread 25, which is designed as an internal thread.

The proposed contacting system 10 favorably creates a way to ensure large tolerances in the assembly of long-moulded parts 100, in which, for example, the positioning of the clamping element 50 can be generously selected on the shielding 102 of the long-moulded part 100 and the stripped part of the shielding does not have to be adapted exactly to the conditions of the contacting system. Another advantage is that the actuation of the contacting system, i.e., contacting with the shielding, can be carried out independently of further assembly steps, thus further simplifying the assembly of the long-moulded part.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A contacting system comprising:
    a screw-on sleeve, wherein the screw-on sleeve on a first side comprises a connection section, an actuating element and a clamping element, wherein the clamping element comprises at least an inner sheath surface and at least a first end surface, wherein the connection section comprises a connection thread and an actuating thread, wherein the screw-on sleeve on the first side of the screw-on sleeve comprises the connection thread for connecting to a connection geometry, wherein the connection thread is essentially arranged radially further out than the actuating thread for receiving the actuating element, and wherein the actuating element comprises a counter-pressure end surface, wherein an inner radius of the clamping element can be reduced at least in sections by means of a radial force, wherein the actuating element with the actuating thread can be screwed onto the first side of the screw-on sleeve and wherein, by screwing the actuating element onto the screw-on sleeve, the radial force can be applied to at least the first end surface of the clamping element while at least the counter-pressure end surface of the actuating element can be contacted with the first end surface of the clamping element.

2. The contacting system according to claim 1, wherein an at least partially stripped long-moulded part can be introduced into the contacting system in such a way that, when the actuating element is screwed onto the screw-on sleeve, the clamping element is pressed in such a way that an electrical contact with a shielding or with an element connected to the shielding is established by at least a part of the inner sheath surface of the clamping element.

3. The contacting system according to claim 1, wherein a second end surface and/or the first end surface of the clamping element comprises a chamfer.

4. The contacting system according to claim 1, wherein the clamping element comprises one of a completely continuous slit in a direction of a longitudinal axis of the contacting system, a plurality of slits distributed around a circumference, or no slits.

5. The contacting system according to claim 1, wherein the screw-on sleeve is one of a single piece with the clamping element or as a plurality of parts.

6. The contacting system according to claim 3, wherein the screw-on sleeve comprises a pressure end surface, wherein the clamping element can be introduced into the screw-on sleeve such that the pressure end surface of the screw-on sleeve contacts the second end surface of the clamping element and the counter-pressure end surface of the actuating element contacts the first end surface of the clamping element.

7. The contacting system according to claim 2, further comprising a support sleeve configured to be slid under the shielding of the long-moulded part and/or a crimp sleeve, the crimp sleeve being arranged between the shielding and the clamping element.

8. The contacting system according to claim 1, wherein the screw-on sleeve comprises a double nipple configuration.

9. A screw joint system for screwing on a long-moulded part comprising a contacting system according to claim 1.

10. A method for dissipating electrical currents of a shielding of a long-moulded part comprising the steps of:
    a. providing a contacting system according to claim 1;
    b. partially exposing a shielding of the long-moulded part and introducing the long-moulded part into the contacting system; and
    c. screwing an actuating element of the contacting system onto a screw-on sleeve, wherein the actuating element acts on a clamping element such that the clamping element exerts a radial force onto the shielding of the long-moulded part or onto an element connected to the shielding, wherein, by screwing the actuating element, the clamping element is electrically contacted with the shielding or with an element connected to the shielding.

11. The method according to claim 10, wherein a support sleeve is placed under the shielding before the long-moulded part is introduced into the contacting system.

12. The method according to claim 10, wherein a crimp sleeve is placed on the shielding as the element connected to the shielding before the long-moulded part is introduced into the contacting system.

13. The method according to claim 10, wherein the screwing in of the actuating element for clamping the clamping element to the shielding or to an element connected to the shielding takes place before or after a connection of the long-moulded part to a consumer.

* * * * *